(12) United States Patent
Ito

(10) Patent No.: US 9,126,107 B2
(45) Date of Patent: Sep. 8, 2015

(54) ACCESS MANAGEMENT SERVER, ACCESS MANAGEMENT METHOD, ACCESS MANAGEMENT PROGRAM, AND COMPUTER READABLE RECORDING MEDIUM RECORDING THE PROGRAM

(75) Inventor: Kensuke Ito, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 492 days.

(21) Appl. No.: 13/582,377

(22) PCT Filed: Jun. 22, 2011

(86) PCT No.: PCT/JP2011/064306
§ 371 (c)(1),
(2), (4) Date: Aug. 31, 2012

(87) PCT Pub. No.: WO2011/162304
PCT Pub. Date: Dec. 29, 2011

(65) Prior Publication Data
US 2013/0137499 A1    May 30, 2013

(30) Foreign Application Priority Data
Jun. 24, 2010 (JP) .............................. P2010-143721

(51) Int. Cl.
*A63F 9/24* (2006.01)
*A63F 13/00* (2014.01)
*G06Q 30/02* (2012.01)

(52) U.S. Cl.
CPC ................ *A63F 13/00* (2013.01); *G06Q 30/02* (2013.01)

(58) Field of Classification Search
CPC .................................................... A63F 13/00
See application file for complete search history.

(56) References Cited

U.S. PATENT DOCUMENTS

| 6,884,167 | B2 * | 4/2005 | Walker et al. .................. 463/20 |
| 8,216,055 | B2 * | 7/2012 | Okada ............................. 463/20 |
| 2002/0165019 | A1 * | 11/2002 | Slomiany ........................ 463/16 |
| 2002/0193162 | A1 * | 12/2002 | Walker et al. .................. 463/42 |

FOREIGN PATENT DOCUMENTS

JP    2009265833A            11/2009

OTHER PUBLICATIONS

English translation of the International Preliminary Report on Patentability issued on Jan. 24, 2013 in counterpart PCT/JP2011/064306.

* cited by examiner

*Primary Examiner* — Reginald Renwick
(74) *Attorney, Agent, or Firm* — Sughrue Mion, PLLC

(57) ABSTRACT

A server includes a request receiving unit that receives request information from a terminal, a request processing unit that generates next screen information for displaying a next screen on the terminal in accordance with the received request information, a next screen transmitting unit that transmits the generated next screen information to the terminal, a judgment unit that judges whether the next screen information has been transmitted to the terminal, a presentation screen generation unit that, when it is judged that the next screen information has not been transmitted to the terminal, determines reward conditions regarding a predetermined reward based on a screen transition status in the terminal, and generates lottery presentation screen information for displaying a lottery presentation screen on the terminal based on the reward conditions, and a presentation screen transmitting unit that transmits the generated lottery presentation screen information to the terminal.

7 Claims, 14 Drawing Sheets

Fig.3

SHOPPING CART

Welcome User A

Items in the shopping cart
Item added to the shopping cart

| Items | | Unit Price | Quantity | Sub Total | Tax | Shipping Fee | COD Fee | Change |
|---|---|---|---|---|---|---|---|---|
| | Item S<br>Size: 4<br>Color: Black | 9,450 Yen | ▶ 1 | 9,450 Yen | Incl. | Excl. | Excl. | Delete |
| | Item T<br>Size: S<br>Color: Blue | 5,000 Yen | ▶ 1 | 5,000 Yen | Incl. | Excl. | Excl. | Delete |

( Proceed to Checkout → )

Fig.4

ORDER SCREEN STEP 1

Items in the shopping cart

| Items | | Unit Price | Quantity | Sub Total | Tax | Shipping Fee | COD Fee |
|---|---|---|---|---|---|---|---|
| | Item S<br>Size: 4<br>Color: Black | 9,450 Yen | 1 | 9,450 Yen | Incl. | Excl. | Excl. |
| | Item T<br>Size: S<br>Color: Blue | 5,000 Yen | 1 | 5,000 Yen | Incl. | Excl. | Excl. |
| | | | Total | 14,450 Yen | | | |

Customer Information

Please enter your user ID and password, then click "Continue"

| User ID | abcd |
| --- | --- |
| Password | |

Ship to:
● Same address as your member info
○ A new address (or Multiple addresses;
Shipping address list available) *For gifts

ORDER SCREEN STEP 2

Items in the shopping cart

| Items | | Unit Price | Quantity | Sub Total | Tax | Shipping Fee | COD Fee |
|---|---|---|---|---|---|---|---|
| | Item S<br>Size: 4<br>Color: Black | 9,450 Yen | 1 | 9,450 Yen | Incl. | Excl. | Excl. |
| | Item T<br>Size: S<br>Color: Blue | 5,000 Yen | 1 | 5,000 Yen | Incl. | Excl. | Excl. |
| | | | Total | 14,450 Yen | | | |

Payment

Select your point usage

User A's usable points: 2,442 points (yen)
You can use the points!
You can use 1 point as 1 yen. Select your usage.

○ Use points
   Select the points more in details on the next step

◉ Do not use points
   Purchase without using any points

ORDER SCREEN STEP 3

Please confirm your order

Click the "Place your order" button to submit your order to the shop

[Place your order]

(1) Customer Information

| Name | User A |
|---|---|
| Address | ......... |
| Phone Number | ......... |
| Email Address | ......... |

[Change customer information]

(2) Shipping Information

| No. | Name | Address | Phone Number |
|---|---|---|---|
| 1 | User A | ......... | ......... |

[Change address/quantity]

(3) Purchased Items

| Items | | Unit Price | Quantity | Sub Total | Tax | Shipping Fee | COD Fee |
|---|---|---|---|---|---|---|---|
| | Item S<br>Size: 4<br>Color: Black | 9,450 Yen | 1 | 9,450 Yen | Incl. | Excl. | Excl. |
| | Item T<br>Size: S<br>Color: Black | 5,000 Yen | 1 | 5,000 Yen | Incl. | Excl. | Excl. |
| | | | Total | 14,450 Yen | | | |

| Page Intended for Transmission | Conditions to Provide Corresponding Lottery Presentation Screen | Reward Conditions |
|---|---|---|
| Shopping Cart Page | Display of the shopping cart page is requested | 1000 points are awarded when a to c are all satisfied: (a) Accessing a virtual shopping mall at a specified time (b) Satisfying specified purchase amount and purchase quantity (c) User ID ends in "a" |
| Order Page | Display of the order page (any page) is requested | 1000 points are awarded when a to c are all satisfied: (a) Accessing a virtual shopping mall during a specified time period (b) Qualified as a client (c) User ID ends in "a", "b" or "c" |
| Order Confirmation Page | Display of the order confirmation page is requested | 1000 points are awarded without condition |

(b)

| Page Intended for Transmission | Conditions to Provide Corresponding Lottery Presentation Screen | Reward Conditions |
|---|---|---|
| Shopping Cart Page | Display of the shopping cart page is requested | Winning probability=10% Awarded points =1000 |
| Order Page | Display of the order page (any page) is requested | Winning probability=15% Awarded points =2000 |
| Order Confirmation Page | Display of the order confirmation page is requested | Winning probability=20% Awarded points =3000 |

ACCESS MANAGEMENT SERVER, ACCESS MANAGEMENT METHOD, ACCESS MANAGEMENT PROGRAM, AND COMPUTER READABLE RECORDING MEDIUM RECORDING THE PROGRAM

CROSS REFERENCE TO RELATED APPLICATIONS

This application is a National Stage of International Application No. PCT/JP2011/064306 filed on Jun. 22, 2011, which claims priority from Japanese Patent Application No. 2010-143721, filed on Jun. 24, 2010, the contents of all of which are incorporated herein by reference in their entirety.

TECHNICAL FIELD

One embodiment of the present invention relates to an access management server, an access management method, an access management program, and a computer readable recording medium recording the program.

BACKGROUND ART

When accessing a site on the Internet, there is a case where access cannot be made for some reason, and, in this case, an error page is displayed. An advertising system that displays an advertisement which matches user's interests and preferences on the error page is disclosed in the following Patent Literature 1, for example.

CITATION LIST

Patent Literature

PTL 1: JP 2009-265833 A

SUMMARY OF INVENTION

Technical Problem

However, it is considered that a user (viewer) leaves the site if the error page is merely displayed. Although the probability that a user stays on the site increases in the case where an advertisement is displayed as described in the above Patent Literature 1 compared with the case where no advertisement is displayed, the effect is not always high enough.

In view of the above, it is desirable to make a user stay on a site even when the user cannot access a specified web page in the site.

Solution to Problem

An access management server according to one embodiment of the present invention is an access management server for sequentially displaying screens on a terminal in accordance with request information received from the terminal, including a request receiving means for receiving the request information from the terminal, a next screen generation means for generating next screen information for displaying a next screen on the terminal in accordance with the request information received by the request receiving means, a next screen transmitting means for transmitting the next screen information generated by the next screen generation means to the terminal, a judgment means for judging whether the next screen information has been transmitted to the terminal by the next screen transmitting means, a determination means for determining reward conditions regarding a predetermined reward based on a screen transition status of the terminal when it is judged that the next screen information has not been transmitted to the terminal, a presentation screen generation means for generating lottery presentation screen information for displaying a lottery presentation screen on the terminal based on the reward conditions determined by the determination means, the reward conditions being displayed on the lottery presentation screen in accordance with the screen transition status, and a presentation screen transmitting means for transmitting the lottery presentation screen information generated by the presentation screen generation means to the terminal.

An access management method according to one embodiment of the present invention is an access management method executed by an access management server for sequentially displaying screens on a terminal in accordance with request information received from the terminal, including a request receiving step of receiving the request information from the terminal, a next screen generation step of generating next screen information for displaying a next screen on the terminal in accordance with the request information received in the request receiving step, a next screen transmitting step of transmitting the next screen information generated in the next screen generation step to the terminal, a judgment step of judging whether the next screen information has been transmitted to the terminal in the next screen transmitting step, a determination step of determining reward conditions regarding a predetermined reward based on a screen transition status of the terminal when it is judged that the next screen information has not been transmitted to the terminal, a presentation screen generation step of generating lottery presentation screen information for displaying a lottery presentation screen on the terminal based on the reward conditions determined in the determination step, the reward conditions being displayed on the lottery presentation screen in accordance with the screen transition status, and a presentation screen transmitting step of transmitting the lottery presentation screen information generated in the presentation screen generation step to the terminal.

An access management program according to one embodiment of the present invention is an access management program causing a computer to function as an access management server for sequentially displaying screens on a terminal in accordance with request information received from the terminal, the access management program causing the computer to execute a request receiving means for receiving the request information from the terminal, a next screen generation means for generating next screen information for displaying a next screen on the terminal in accordance with the request information received by the request receiving means, a next screen transmitting means for transmitting the next screen information generated by the next screen generation means to the terminal, a judgment means for judging whether the next screen information has been transmitted to the terminal by the next screen transmitting means, a determination means for determining reward conditions regarding a predetermined reward based on a screen transition status of the terminal when it is judged that the next screen information has not been transmitted to the terminal, a presentation screen generation means for generating lottery presentation screen information for displaying a lottery presentation screen on the terminal based on the reward conditions determined by the determination means, the reward conditions being displayed on the lottery presentation screen in accordance with the screen transition status, and a presentation screen transmitting means for transmitting the lottery presentation screen information generated by the presentation screen generation means to the terminal.

A computer readable recording medium according to one embodiment of the present invention is a computer readable recording medium recording an access management program causing a computer to function as an access management server for sequentially displaying screens on a terminal in accordance with request information received from the terminal, the access management program causing the computer to execute a request receiving means for receiving the request information from the terminal, a next screen generation means for generating next screen information for displaying a next screen on the terminal in accordance with the request information received by the request receiving means, a next screen transmitting means for transmitting the next screen information generated by the next screen generation means to the terminal, a judgment means for judging whether the next screen information has been transmitted to the terminal by the next screen transmitting means, a determination means for determining reward conditions regarding a predetermined reward based on a screen transition status of the terminal when it is judged that the next screen information has not been transmitted to the terminal, a presentation screen generation means for generating lottery presentation screen information for displaying a lottery presentation screen on the terminal based on the reward conditions determined by the determination means, the reward conditions being displayed on the lottery presentation screen in accordance with the screen transition status, and a presentation screen transmitting means for transmitting the lottery presentation screen information generated by the presentation screen generation means to the terminal.

According to the embodiment, when the transmission of the next screen information fails during a series of processes, the lottery presentation screen that offers chances to earn points to a user is displayed on the terminal. The lottery presentation screen is a screen generated on the basis of reward conditions determined based on the status of screen transition in the terminal, and the reward conditions are displayed in accordance with the status of screen transition on the lottery presentation screen. The screen transition status indicates a user's visiting status in the site (at which stage of the web page a user is accessing). Because a user can play a lottery after checking reward conditions corresponding to the visiting status in the site through the lottery presentation screen as described above, it is possible to arouse the user's passion for gambling, thereby keeping a user stay in the site. Further, a site establisher can preferentially make a user desired to remain in a site stay in the site by offering the lottery presentation screen in accordance with the screen transition status (user's visiting status).

The access management server according to another embodiment may further include a registration means for finalizing a reward to be awarded to a user of the terminal based on a lottery result on the lottery presentation screen when the next screen is displayed on the terminal by a re-request for the next screen information from the terminal, and storing the finalized reward for the user into a predetermined database.

In this manner, by finalizing a reward only after the next screen that should be displayed originally is displayed, it is possible to prevent a user from just playing a lottery and leaving the site.

In the access management server according to yet another embodiment, a payout rate may be included in the reward conditions, and a payout rate when second next screen information corresponding to a second screen to be displayed later than a first screen has not been transmitted may be higher than a payout rate when first next screen information corresponding to the first screen has not been transmitted.

In this manner, by setting a hither payout rate as it has proceeded to the later screen in the terminal, it is possible to increase the possibility that a user who has proceeded to the later stage in the site stays in the site.

In the access management server according to yet another embodiment, the lottery presentation screen may continue to be displayed on the terminal until the next screen is displayed on the terminal by a re-request for the next screen information from the terminal, and a lottery result on the lottery presentation screen may be shown before transition from the lottery presentation screen to the next screen.

In this manner, by displaying the lottery presentation screen until the next screen that should be displayed originally is displayed and showing a lottery result before transition to the next screen, it can be expected to more reliably keep a user stay in the site.

In the access management server according to yet another embodiment, the lottery presentation screen may be constructed so that a user of the terminal can execute a lottery a plurality of times, and a payout rate for a lottery on the lottery presentation screen may be adjusted in accordance with the number of times of lotteries so that the payout rate decreases as an increase in the number of times of lotteries.

In this manner, by offering chances to earn a reward to a user a plurality of times on the lottery presentation screen, it can be expected to more reliably keep the user stay in the site. Further, in this case, by reducing the payout rate as an increase in the number of times of lotteries, consideration can be given to a provider of a reward as well.

Advantageous Effects of Invention

According to one aspect of the present invention, it is possible to make a user stay on a site even when the user cannot access a specified web page in the site.

BRIEF DESCRIPTION OF DRAWINGS

FIG. 3 is a diagram showing an example of a shopping cart page.

FIG. 4 is a diagram showing an example of an order page.

FIG. 5 is a diagram showing an example of an order page.

FIG. 6 is a diagram showing an example of an order confirmation page.

FIG. 7(a)(b) is a diagram showing an example of reward condition information;

DESCRIPTION OF EMBODIMENTS

An embodiment of the present invention is described hereinafter in detail with reference to the appended drawings. In this embodiment, an access management server according to one aspect of the present invention is applied to a server in an electronic commerce system. Note that, in the description of the drawings, the same or equivalent elements are denoted by the same reference symbols, and the redundant explanation thereof is omitted.

First, the functions and configuration of an electronic commerce system 1 according to this embodiment are described with reference to FIGS. 1 to 10. The electronic commerce system 1 is a computer system for providing a web site featuring a virtual shopping mall which contains a plurality of online shops to users who intend to purchase an item. The electronic commerce system 1 includes a server (access management server) 10 that provides a virtual shopping mall and a terminal 20 of each user. The server 10 and each terminal 20 can communicate with each other through a network (not shown) such as the Internet. Note that, although only one terminal 20 is shown in FIG. 1 to show the functional configuration of the server 10 and the terminal 20, a plurality of terminal 20 can be included in the electronic commerce system 1.

The server 10 is described firstly. The server 10 is a computer that guides a user through the item purchase procedure by sequentially displaying screens (web pages) regarding purchase of an item on the terminal 20 in accordance with request information received from the terminal 20 and eventually finalizes the purchase process on the basis of a user's operation on the terminal. The server 10 includes, as functional elements, a request receiving unit (request receiving means) 11, a database 12, a request processing unit (next screen generation means) 13, a next screen transmitting unit (next screen transmitting means) 14, a judgment unit (judgment means) 15, a presentation screen generation unit (determination means, presentation screen generation means) 16, a presentation screen transmitting unit (presentation screen transmitting means) 17, and a point update unit (registration means) 18.

Figure 2:
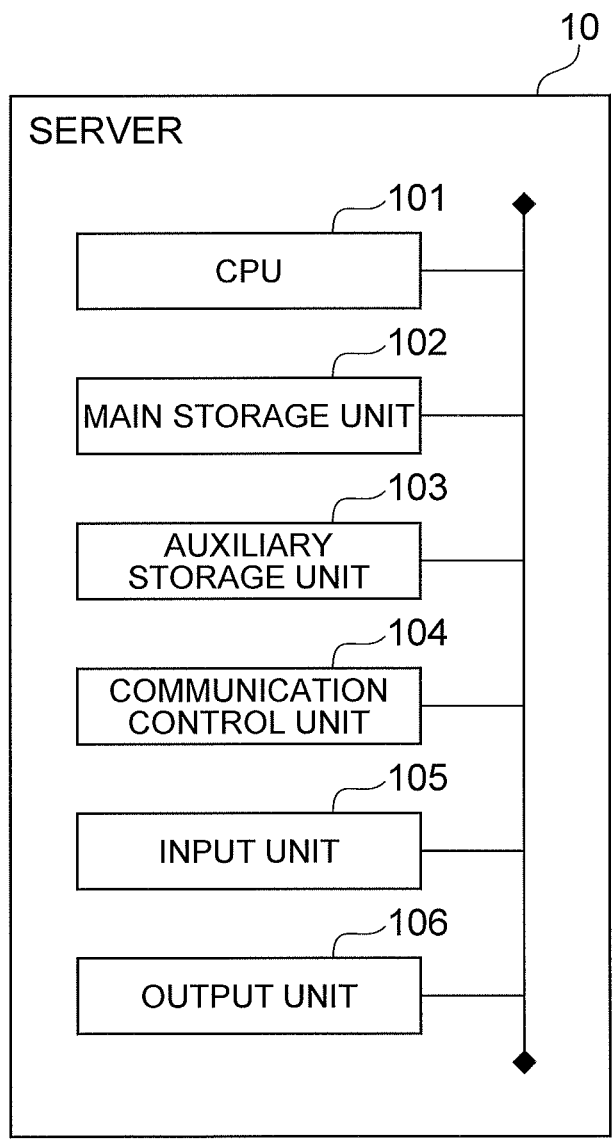
FIG. 2 is a diagram showing a hardware configuration of a server shown in FIG. 1.

The server 10 is composed of a CPU 101 that executes an operating system, an application program and the like, a main storage unit 102 composed of ROM and RAM, an auxiliary storage unit 103 composed of a hard disk or the like, a communication control unit 104 composed of a network card or the like, an input unit 105 such as a keyboard and a mouse, and an output unit 106 such as a monitor as shown in FIG. 2. Note that the server 10 may be composed of one machine or a plurality of machines.

Figure 1:
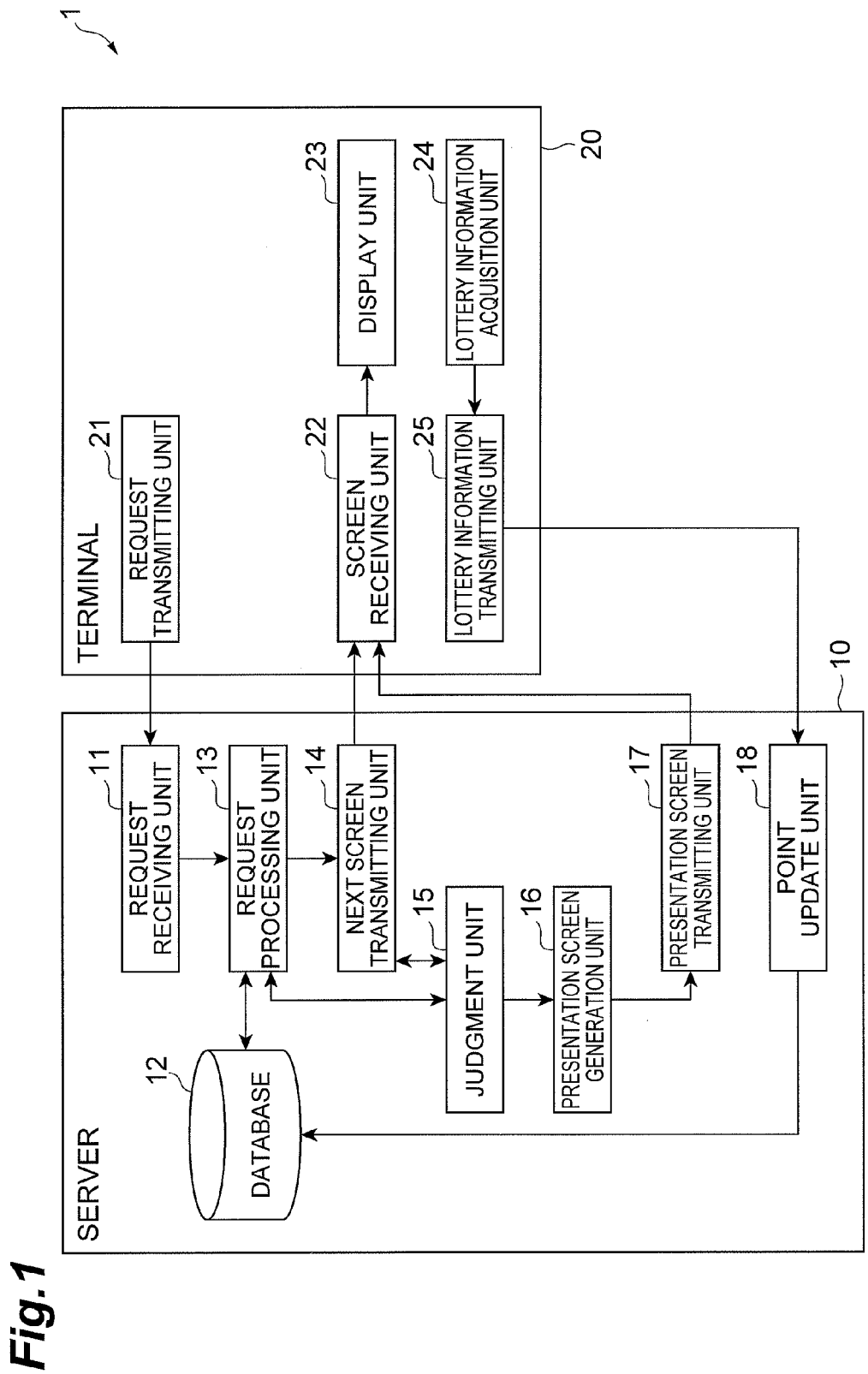
FIG. 1 is a block diagram showing a functional configuration of an electronic commerce system according to an embodiment.

The functions of the server 10 shown in FIG. 1 are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and database required for processing are stored in the main storage unit 102 or the auxiliary storage unit 103.

Referring back to FIG. 1, the request receiving unit 11 is a means of receiving request information from the terminal 20. The request information is information for the terminal 20 to request a process regarding item purchase to the server 10, and, more specifically, it is information containing conditions to narrow down items, the purchase quantity of a specific item, user information, information about the item shipping address and the like. Further, the request information contains a cookie (HTTP cookie or Cookie) for determining which screen is to be displayed next at the time of changing the screen (web page). The request receiving unit 11 outputs the received request information to the request processing unit 13.

The database 12 is a means of storing various types of data related to the item purchase process. Specifically, the database 12 stores shop data about a virtual shop, item data about an item available in the virtual shop, user data about a user, purchase data indicating that a specific user has purchased a specific item and the like.

The shop data includes a shop ID for identifying a shop and various shop attributes (for example, a shop name, a list of payment methods, a list of delivery methods and the like). The item data includes an item ID for identifying an item and various item attributes (an item name, size, color, unit price and the like). The user data includes a user ID for identifying a user and various user attributes (a user name, address, telephone number, password, points earned and the like). In this embodiment, the points earned indicated by the user data is the total of points obtained when a user purchases an item and points earned by a lottery operation on a lottery presentation screen, which is described later. The purchase data includes the user ID of a purchase user, the item ID of an item purchased, the purchase quantity, the selected payment method and delivery method and the like.

Note that the types of data stored in the database 12 and the structure of each data are not limited to those described above.

The request processing unit 13 is a means of executing a process for item purchase on the basis of the request information input from the request receiving unit 11. Specifically, the request processing unit 13 generates screen information (which is referred to hereinafter as "next screen information") for displaying the next web page on the terminal 20 on the basis of the request information. At this time, the request processing unit 13 extracts data that satisfies search conditions indicated by the request information from the database 12 according to need. Further, the request processing unit 13 generates purchase data in accordance with the request information and stores the purchase data into the database 12 in the end.

Among those processes, the process of generating the next screen information is described in detail hereinbelow. Specifically, a process related to three screens, a shopping cart page, an order page and an order confirmation page, which are sequentially displayed on the terminal 20, is described.

The shopping cart page is a web page that displays a list of items selected by a user, and it is generated as shown in FIG. 3, for example. The screen in FIG. 3 shows that a user A selects two types of items, items S and T, as a target of purchase, in other words, that the user A has added those items to a so-called shopping cart. The "Proceed to Checkout" button at the bottom of the screen is a user interface to confirm the selected items and proceed to the next order page.

The order page is a web page to input information required for the purchase procedure, such as user information, shipping address and payment method, and it is generated as shown in FIGS. 4 and 5, for example. FIGS. 4 and 5 show the first and second pages of the order page, respectively.

On the first page of the order page, a list of selected items and the user information (user ID and password) and shipping address form are displayed. The "Continue" button at the bottom of the screen is an interface to confirm the entry and proceed to the second page.

On the second page of the order page, a list of selected items (which is the same as the one on the first page) and the payment method form are displayed. The "Continue" button at the bottom of the screen is an interface to confirm the entry and proceed to the order confirmation page.

The order confirmation page is a web page to display the order details and place the order, and it is generated as shown in FIG. 6, for example. On the screen of FIG. 6, information about a user, who is an orderer, information about a shipping address, and a list of selected items are displayed. The "Place Your Order" button at the top of the screen is an interface to place the order and end the purchase process.

The screen information on each page is constructed in the form that data to be displayed, data regarding screen control and the like are written in markup language or script for screen control is embedded. However, the specification and format of screen information are not limited thereto.

Note that the screen configuration of each of the above-described pages is not limited to those shown in FIGS. 3 to 6. For example, a plurality of order pages shown in FIGS. 4 and 5 may be brought together in one page.

When request information indicating a request for the shopping cart page is input, the request processing unit 13 refers to a cookie in the request information and determines that the screen to be displayed next on the terminal 20 is the shopping cart page. Further, the request processing unit 13 extracts necessary data from the database 12. For example, the request processing unit 13 extracts item data corresponding to the item ID in the request information. Then, the request processing unit 13 generates screen information for the shopping cart page using the extracted data and the like, and outputs it as next screen information to the next screen transmitting unit 14.

When request information indicating a request for the order page is input in response to a user operation on the shopping cart page, the request processing unit 13 refers to a cookie in the request information and determines that the screen to be displayed next is the first page of the order page. Further, the request processing unit 13 extracts necessary data from the database 12. Then, the request processing unit 13 generates screen information for the first page of the order page using the extracted data and the like, and outputs it as next screen information to the next screen transmitting unit 14.

When request information indicating a request for the next page is input in response to a user operation on the first page of the order page, the request processing unit 13 generates screen information for the second page of the order page in the same manner as above. Then, the request processing unit 13 outputs it as next screen information to the next screen transmitting unit 14.

When request information indicating a request for the order confirmation page is input in response to a user operation on the second page of the order page, the request processing unit 13 refers to a cookie in the request information and determines that the screen to be displayed next on the terminal 20 is the order confirmation page. Further, the request processing unit 13 extracts necessary data from the database 12. Then, the request processing unit 13 generates screen information for the order confirmation page using the extracted data and the like, and outputs it as next screen information to the next screen transmitting unit 14.

As described above, the request processing unit generates the next screen information for the terminal 20 to display the next screen in accordance with the request information.

The next screen transmitting unit 14 is a means of transmitting the next screen information input from the request processing unit 13 to the terminal 20.

The judgment unit 15 is a means of judging whether the next screen information has been transmitted to the terminal 20 by the next screen transmitting unit 14.

The judgment unit 15 makes a judgment on the status of screen transition in the terminal 20 on the basis of the cookie in the request information input to the request processing unit 13. The "judgment on the status of screen transition" means to make a judgment as to whether which screen is being displayed and/or which screen is to be displayed next on the terminal 20 during a series of change of web pages from the shopping cart page, the order page to the order confirmation page.

Then, the judgment unit 15 makes a judgment as to whether the generation of the next screen information (the shopping cart page, the order page or the order confirmation page) in the request processing unit 13 has ended normally or not and whether the transmission of the next screen information in the next screen transmitting unit 14 has ended normally or not. Thus, "whether the next screen information has been transmitted or not" is a concept including not only the success or failure of the transmission of the next screen information but also the success or failure of the generation of the next screen information, which is a precondition for the transmission. The judgment unit 15 makes a judgment about the success or failure of the transmission of the next screen information by obtaining an execution result (normal end or abnormal end) of the generation process in the request processing unit 13 and an execution result (normal end or abnormal end) of the transmission process in the next screen transmitting unit 14.

The case where the generation or transmission of the next screen information fails includes the case where the generation process or the transmission process is aborted due to an increase in load on the server 10 or the congestion of a network between the server 10 and the terminal 20 caused by the access concentration on a specific virtual shop or a specific item.

When it is judged that the transmission of the next screen information has failed from detection of an abnormal end due to such causes, the judgment unit 15 generates an anomaly notification that includes a judgment result about the status of screen transition in the terminal 20 (information to identify the page being displayed or the page to be displayed next) and a message indicating a failure of the transmission of the next screen information. The judgment unit 15 then outputs the anomaly notification to the presentation screen generation unit 16. On the other hand, when it is detected that both of the generation process and the transmission process have ended normally, the judgment unit 15 ends the process without outputting anything.

The presentation screen generation unit 16 is a means of generating lottery presentation screen information for the terminal 20 to display a lottery presentation screen when it is determined that the next screen information has not been transmitted to the terminal 20. The lottery presentation screen is a web page that is displayed on the terminal 20 when the transmission of a web page that should be displayed on the terminal 20 (for example, the shopping cart page, the order page or the order confirmation page) has failed, and it allows a user to draw lots.

When the anomaly notification is input, the presentation screen generation unit 16 analyses the notification and identifies the web page that should have been displayed next on the terminal 20, i.e. the web page that should have been transmitted to the terminal 20 as the next screen information (which is referred to hereinafter as the "page intended for transmission"). Then, the presentation screen generation unit 16 determines reward conditions on the basis of the page intended for transmission. For this purpose, the presentation screen generation unit 16 pre-stores reward condition information indicating a correspondence among the page intended for transmission, conditions to display the corresponding lottery presentation screen (conditions to provide the lottery presentation screen), and reward conditions. The reward conditions are conditions regarding a predetermined reward awarded to a user, and its details may be determined arbitrarily.

FIG. 7 shows several examples of the reward condition information. In the example shown in FIG. 7(*a*), reward conditions including points awarded as a reward and conditions for a user to earn the points (winning conditions) are set for each of the pages intended for transmission (the shopping cart page, the order page and the order confirmation page). In this example, although the reward points are the same, the winning conditions become less strict as it has proceeded to the later web page in the terminal 20 (as the item purchase procedure has proceeded to the later stage). This means that the winning probability increases as it has proceeded to the later web page in the terminal 20 (as the item purchase procedure has proceeded to the later stage).

In the example shown in FIG. 7(*b*), reward conditions including winning probability and awarded points are set for each of the pages intended for transmission. In this example, it is set so that the winning probability increases and the awarded points increase as it has proceeded to the later web page in the terminal 20.

In this manner, the details of the reward conditions are not particularly limited. The winning probability and awarded points corresponding to each of the pages intended for transmission may be set to arbitrary values by an arbitrary method in consideration of funds, payout rate and the like of an agent that grants a reward. Thus, the funds and payout rate can be regarded as the reward conditions.

For example, the payout rate may be set higher as it has proceeded to the later web page in the terminal 20, and the winning probability and awarded points may be set according to the payout rate. For example, a payout rate Pr2 in the case where the order page has not been transmitted is set higher than a payout rate Pr1 in the case where the shopping cart page has not been transmitted, and a payout rate Pr3 in the case where the order confirmation page has not been transmitted is set higher than the payout rate Pr2. In this manner, by setting a hither payout rate as it has proceeded to the later screen in the terminal 20, it is possible to increase the possibility that a user who has proceeded to the later stage in the site stays in the site. As a matter of course, the payout rate may be set constant regardless of the status of screen transition.

Although it is set so that the reward conditions become more advantageous for a user as it has proceeded to the later web page in the terminal 20 in the example of FIG. 7, whether or not to employ such a setting method or not is also arbitrary.

The configuration of the reward condition information is not limited to the example shown in FIG. 7. For example, the reward condition information composed only of the page intended for transmission and the reward conditions may be used. Further, the reward condition information composed of the page currently displayed on the terminal 20 and the reward conditions may be prepared without using the page intended for transmission.

The presentation screen generation unit 16 selects the reward condition information corresponding to the identified page intended for transmission. The selection means that the presentation screen generation unit 16 determines the reward conditions on the basis of the status of screen transition in the terminal 20. Then, the presentation screen generation unit 16 generates lottery presentation screen information that contains a program and data regarding display and control of the lottery presentation screen and an identifier of the page intended for transmission on the basis of the reward conditions indicated by the selected reward condition information. The lottery presentation screen has a function of automatically requesting the page intended for transmission upon occurrence of a predetermined event, and the identifier of the page intended for transmission is used for the automatic request. A game such as a slot that is displayed on the lottery presentation screen is controlled on the basis of the reward conditions. The presentation screen generation unit 16 outputs the generated lottery presentation screen information to the presentation screen transmitting unit 17.

Note that, when the reward condition information is information that associates the page currently displayed on the terminal 20 and the reward conditions, the presentation screen generation unit 16 can determine the reward conditions after identifying the currently displayed page on the terminal 20 based on the anomaly notification.

The presentation screen transmitting unit 17 is a means of transmitting the lottery presentation screen information input from the presentation screen generation unit 16 to the terminal 20.

By the above-described process of the presentation screen generation unit 16 and the presentation screen transmitting unit 17, the lottery presentation screen is displayed on the terminal 20. Hereinafter, examples of the lottery presentation screen that is generated on the basis of the reward condition information shown in FIG. 7(*b*) are shown in FIGS. 8 to 10.

On a lottery presentation screen E, a message Ea indicating that the next screen cannot be displayed due to access concentration, a message Eb indicating that a user can draw lots with more advantageous conditions than those offered before an item is added to the shopping cart, and a slot game F are displayed. The slot game F includes reels Fa to Fc. A user can try to earn points by playing the slot game and obtain points when three "7" are lined up. Note that the message Eb is a message indicating that a user can draw lots with more advantageous conditions than those offered when the next screen cannot be displayed at the point of time when an item is added to the shopping cart (which is referred to hereinafter as "reference time point"; which is when a user only intends to view an item page, for example) and the lottery presentation screen is displayed to draw lots.

Figure 8:
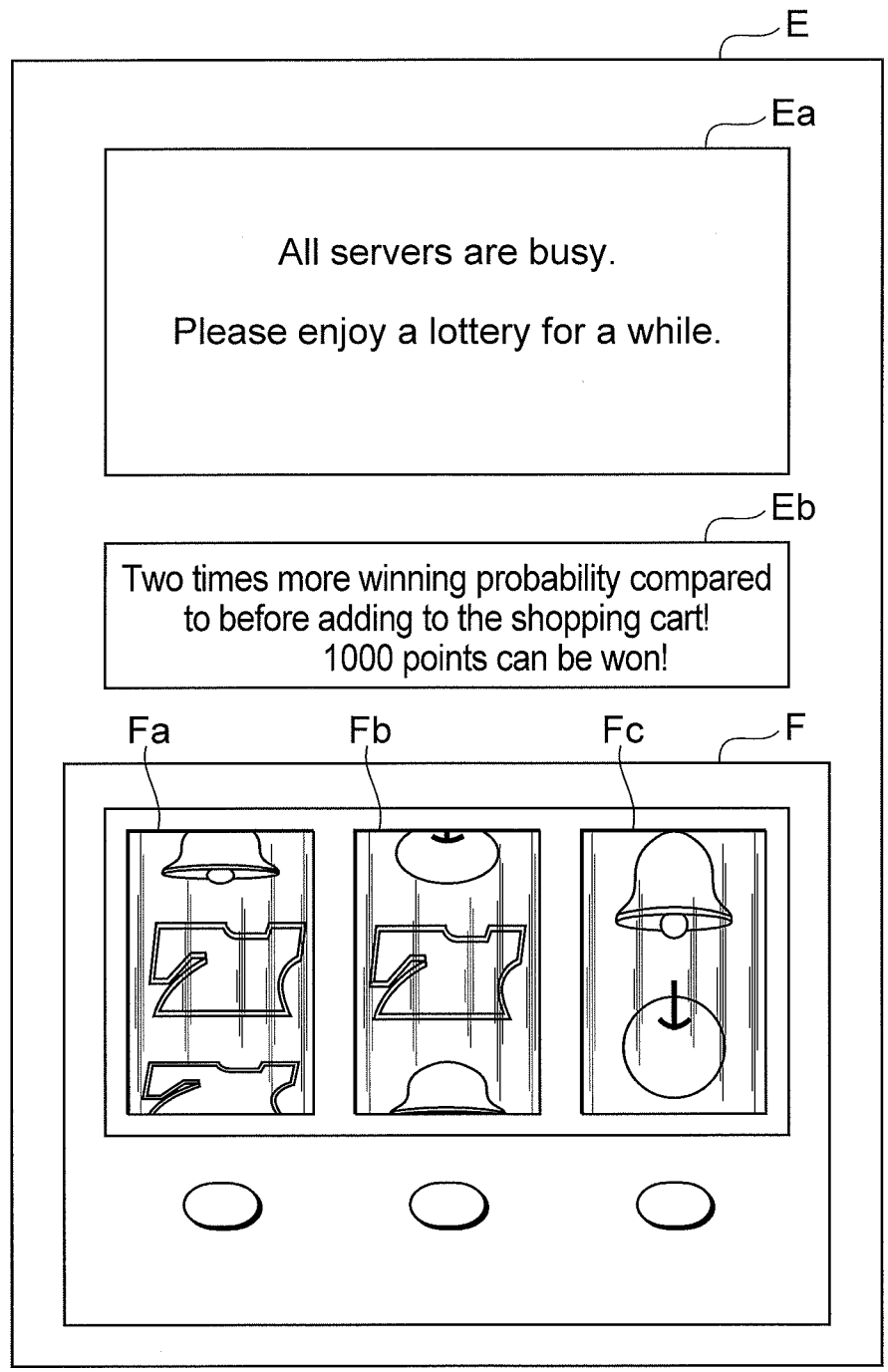
FIG. 8 is a diagram showing an example of a lottery presentation screen.

When the transmission of the shopping cart page has failed, the lottery presentation screen E as shown in FIG. 8 is generated by the server 10 and displayed on the terminal 20. In this case, all of the reels Fa to Fc are spinning, and a user tries to earn points by manipulating three buttons corresponding to the three reels. Further, in this case, a message Mb indicating that the winning probability is double those at the reference time point and that special points (1000 points) can be awarded is shown.

Figure 9:
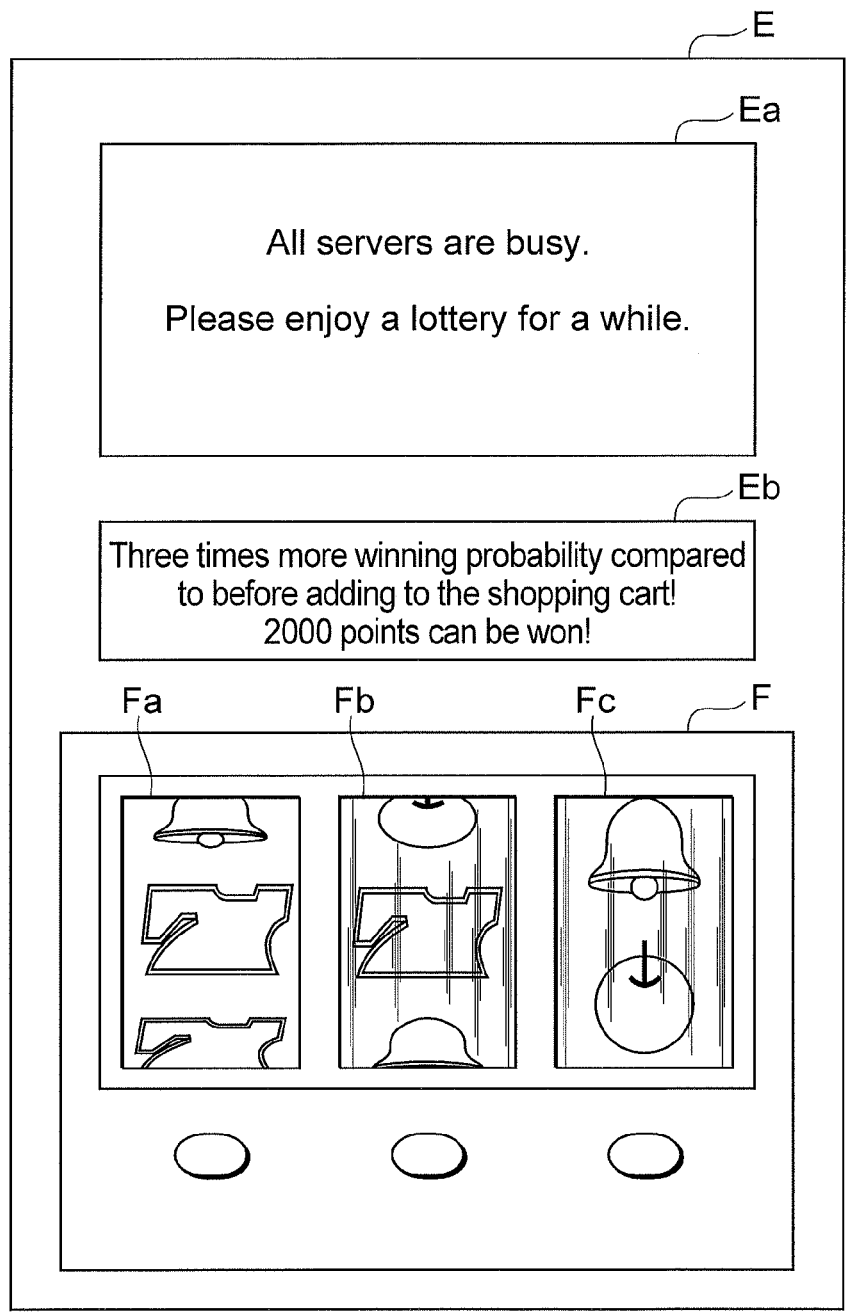
FIG. 9 is a diagram showing another example of a lottery presentation screen.
Figure 10:
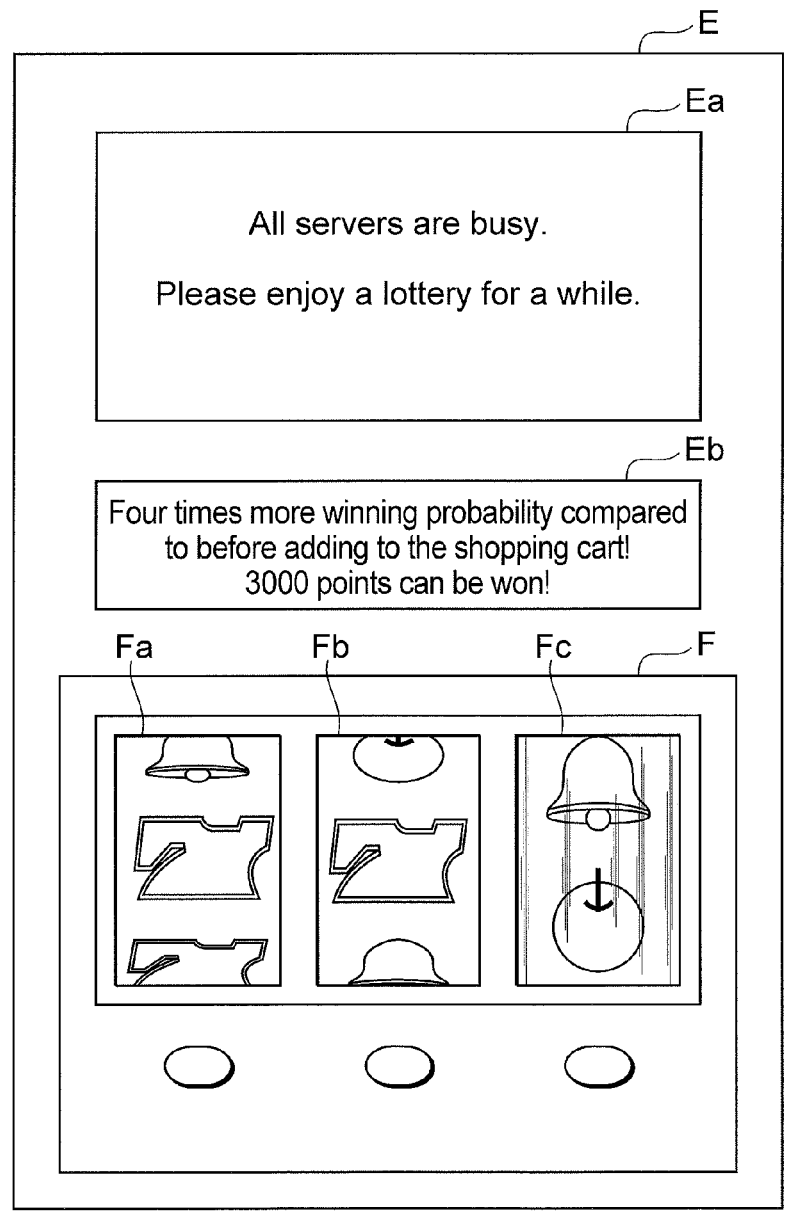
FIG. 10 is a diagram showing a yet another example of a lottery presentation screen.

When the transmission of the order page has failed, the lottery presentation screen E as shown in FIG. 9 is generated by the server 10 and displayed on the terminal 20. In this case, the reel Fa is stopping at the position "7" from the beginning, and only the reels Fb and Fc are spinning A user tries to earn points by manipulating two buttons corresponding to the reels Fb and Fc. Further, in this case, a message Mb indicating that the winning probability is triple those at the reference time point and that special points (2000 points) can be awarded is shown.

When the transmission of the order confirmation page has failed, the lottery presentation screen E as shown in FIG. 10 is generated by the server 10 and displayed on the terminal 20. In this case, the reels Fa and Fb are stopping at the position "7" from the beginning, and only the reel Fc is spinning A user tries to earn points by manipulating one button corresponding to the reel Fc. Further, in this case, a message Mb indicating that the winning probability is four times those at the reference time point and that special points (3000 points) can be awarded is shown.

In the examples of FIGS. 8 to 10, indication that winning probability is higher than that at the reference time point and special points are directly displayed as a part of the message Mb on the lottery presentation screen E. Further, the winning probability, which is winning likelihood, is indirectly shown as the initial state of the reels Fa to Fc. In this manner, because the reward conditions determined in accordance with the status of screen transition of the terminal 20 are displayed on the lottery presentation screen E, a user can get to know with what advantageous conditions the user can try to earn point according to the progress of the procedure of item purchase.

As described above, the function of automatically requesting the page intended for transmission upon occurrence of a predetermined event is embedded in the lottery presentation screen. In the examples of FIGS. 8 to 10, a request for the page intended for transmission is automatically transmitted to the server 10 each time a user finishes the slot game. In the server 10, the request receiving unit 11 receives the re-request and then the request processing unit 13 and the next screen transmitting unit 14 execute re-generation and re-transmission of the next screen information, respectively. When the re-execution has succeeded, the original next screen (the shopping cart page, the order page or the order confirmation page) is displayed instead of the lottery presentation screen on the terminal 20. On the other hand, when the re-execution has failed, the lottery presentation screen continues to be displayed. In this case, a user can try to draw lots again. Thus, the lottery presentation screen continues to be displayed until the original next screen is displayed, and a user can enjoy lottery games during that period.

The configuration and function of the lottery presentation screen may be determined arbitrarily. For example, a dice game, a puzzle game or the like may be used as the lottery game. When the time to play a single game is long to a certain extent, a program for the lottery presentation screen may make a request for the page intended for transmission at regular intervals and, when it is determined that the next screen can be displayed, reduce the game time and show a lottery result to a user.

By displaying the lottery presentation screen until the next screen that should be displayed originally is displayed and making sure to display a lottery result before transition to the next screen, it can be expected to more reliably keep a user stay in the site. Further, by offering chances to earn points to a user a plurality of times on the lottery presentation screen, it can be expected to more reliably keep the user stay in the site.

In the case of enabling a plural of times of lotteries, the payout rate for a lottery on the lottery presentation screen may be adjusted in accordance with the number of times of lotteries so that the payout rate decreases as an increase in the number of times of lotteries in order to give consideration to a provider of a reward. This is one technique to avoid falling below funds of a reward provider. For example, the function of the lottery presentation screen may be set so that the winning probability decreases from 30%, 25% to 20% as the number of times of lotteries increases from one to three. Note that such control of the payout rate may be implemented by changing the winning probability within a program embedded in the lottery presentation screen on the basis of a preset rule, without communication of the program with the server 10. Alternatively, each time the number of times of lotteries increases, the program may make inquiries about the winning probability corresponding to the number of times of lotteries to the server 10 and apply the winning probability received from the server 10 to thereby implement the control.

Instead of offering chances for a lottery a plurality of times to a user, a lottery with a long play time may be offered to a user just once. In this case, before transition to the next screen, a play time is reduced and a lottery result is displayed.

Only some of lottery conditions may be directly or indirectly displayed on the lottery presentation screen. For example, only one of the winning probability and awarded points may be displayed in the example of FIGS. 8 to 10.

The point update unit 18 is a means of updating points of a user that are stored in the database 12 on the basis of lottery information received from the terminal 20. The lottery information is information indicating a result of a lottery played on the lottery presentation screen displayed on the terminal 20, and it contains a user ID and a result of the game or points earned by the game. When the lottery information indicates that a user has won a lottery, the point update unit 18 adds the points obtained this time to the points earned of user data corresponding to the user ID contained in the lottery information. On the other hand, when the lottery information indicates that a user has not won a lottery, there is no need to add any points, and therefore the point update unit 18 ends the process without updating the user data.

The terminal 20 is described next. As the terminal 20, a portable or stationary personal computer, a mobile phone or the like may be used, though specific types of the terminal are not particularly limited. As shown in FIG. 1, the terminal 20 includes a request transmitting unit 21, a screen receiving unit 22, a display unit 23, a lottery information acquisition unit 24, and a lottery information transmitting unit 25 as functional elements.

The hardware configuration of the terminal 20 is basically the same as that of the server 10 shown in FIG. 2, and the way the functions of the terminal 20 shown in FIG. 1 are implemented using hardware is also the same as that described earlier regarding the server 10. Thus, the detailed description about the hardware configuration of the terminal 20 is omitted.

The request transmitting unit 21 is a means of transmitting the request information generated on the basis of an operation of a user who has accessed a virtual shopping mall. The contents of the request information are as described above.

The screen receiving unit 22 is a means of receiving the screen information transmitted from the server 10 and outputting it to the display unit 23. As described above, there are two types of the screen information received: the next screen information and the lottery presentation screen information.

The display unit 23 is a means of displaying the screen (web page) indicated by the screen information input from the screen receiving unit 22. For example, the display unit 23 displays the shopping cart page, the order page or the order confirmation page as shown in FIGS. 3 to 6, and, in some cases, displays the lottery presentation screen as shown in FIGS. 8 to 10.

The lottery information acquisition unit 24 is a means of acquiring a lottery result played on the lottery presentation screen. The lottery information acquisition unit 24 is implemented when a program contained in the lottery presentation screen information is executed in the terminal 20. The lottery information acquisition unit 24 acquires a user ID and a result of the game or points earned by the game when the next screen information regarding the original next screen is normally transmitted from the server 10 to the terminal 20 by a re-request for the page intended for transmission and the next screen is displayed on the terminal 20. Then, the lottery information acquisition unit 24 generates lottery information that contains those acquired data and outputs the lottery information to the lottery information transmitting unit 25.

The lottery information transmitting unit 25 is a means of transmitting the lottery information input from the lottery information acquisition unit 24 to the server 10. The lottery information transmitting unit 25 is also implemented when a program contained in the lottery presentation screen information is executed in the terminal 20. The lottery information is transmitted when the next screen that should be displayed originally is displayed on the terminal 20, and processed by the point update unit 18 of the server 10 as described above. Thus, the points obtained by winning a lottery are finalized only after the next screen is displayed.

Hereinafter, the operation of the electronic commerce system 1 is described and an access management method according to this embodiment is also described with reference to FIGS. 11 to 13.

Figure 11:
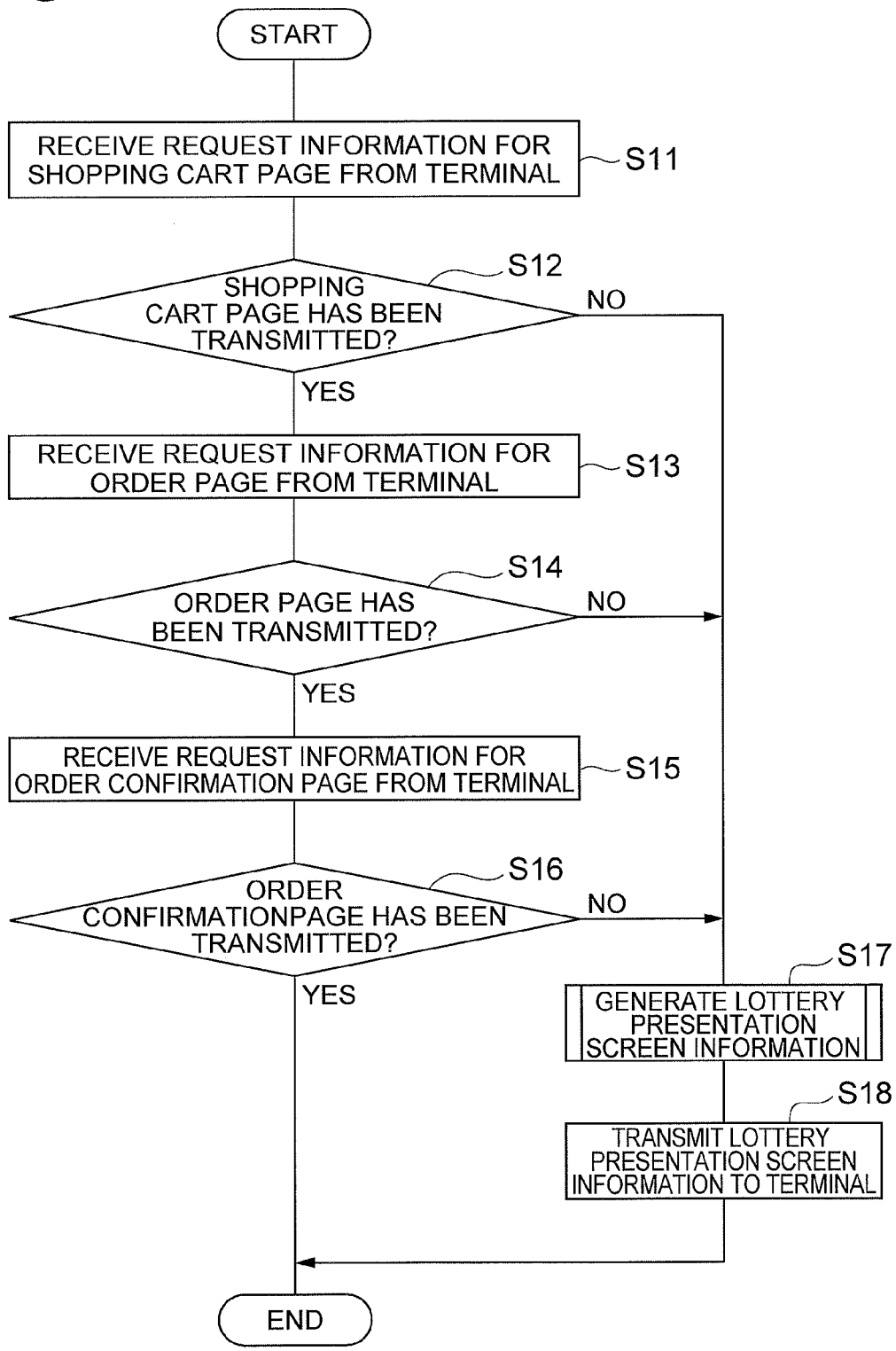
FIG. 11 is a flowchart showing a process of transmitting screen information.
Figure 12:
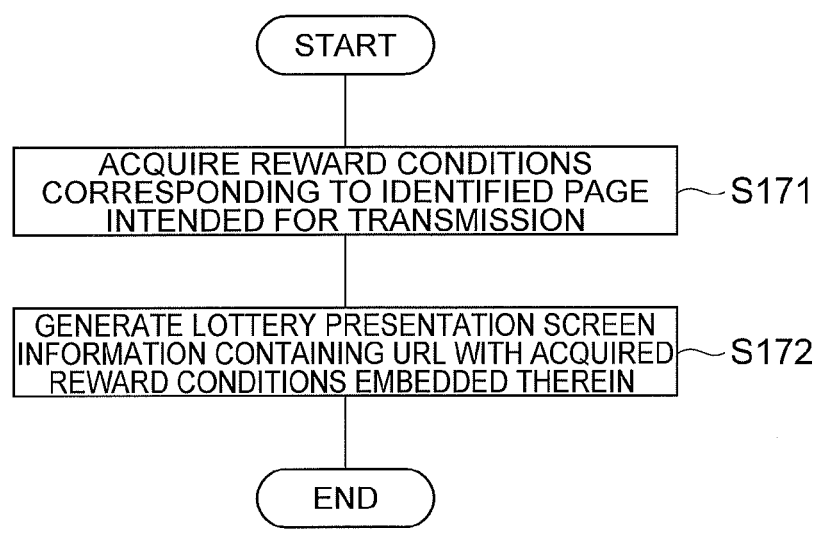
FIG. 12 is a flowchart showing details of a process of generating lottery presentation screen information shown in FIG. 11.

The process of transmitting the respective types of screen information is executed as shown in FIG. 11. When the request receiving unit 11 receives request information that requests the shopping cart page, the request processing unit 13 executes the process of generating screen information for the page, and the next screen transmitting unit 14 executes the process of transmitting the screen information (Step S11). At this time, the judgment unit 15 judges the success or failure of the generation and transmission processes (Step S12).

When the shopping cart page generation and transmission processes have both succeeded (YES in Step S12), the request receiving unit 11 receives request information for the order page from the terminal 20 after that, and the request processing unit 13 and the next screen transmitting unit 14 execute the processes of generating and transmitting screen information for the order page (Step S13). At this time, the judgment unit 15 judges the success or failure of those processes (Step S14). When the order page is constructed containing a plurality of pages as shown in FIGS. 4 and 5, the processes of Steps S13 and S14 are executed a plurality of times.

When the order page generation and transmission processes have both succeeded (YES in Step S14), the request receiving unit 11 receives request information for the order confirmation page from the terminal 20 after that, and the request processing unit 13 and the next screen transmitting unit 14 execute the processes of generating and transmitting screen information for the order confirmation page (Step S15). At this time, the judgment unit 15 judges the success or failure of those processes (Step S16). When the order confirmation page has been transmitted to the terminal 20 (YES in Step S16), the item purchase process ends by a user operation on the page.

During a series of processes described above, when the transmission of any of the shopping cart page, the order page and the order confirmation page has failed (NO in Step S12, S14 or S16), the presentation screen generation unit 16 generates lottery presentation screen information in accordance with the status of screen transition (Step S17). Specifically, the presentation screen generation unit 16 acquires reward conditions corresponding to the page by identifying the page intended for transmission from an anomaly notification input from the judgment unit 15 and referring to the reward condition information (Step S171). Then, the presentation screen generation unit 16 generates lottery presentation screen information on the basis of the reward conditions (Step S172). Finally, the presentation screen transmitting unit 17 transmits the lottery presentation screen information to the terminal 20 (Step S18).

Step S11 corresponds to a request receiving step, a next screen generation step, and a next screen transmitting step. The same applies to Steps S13 and S15. Steps S12, S14 and S16 correspond to a judgment step. Step S171 corresponds to a determination step, Step S172 corresponds to a presentation screen generation step, and Step S18 corresponds to a presentation screen transmitting step.

Figure 13:
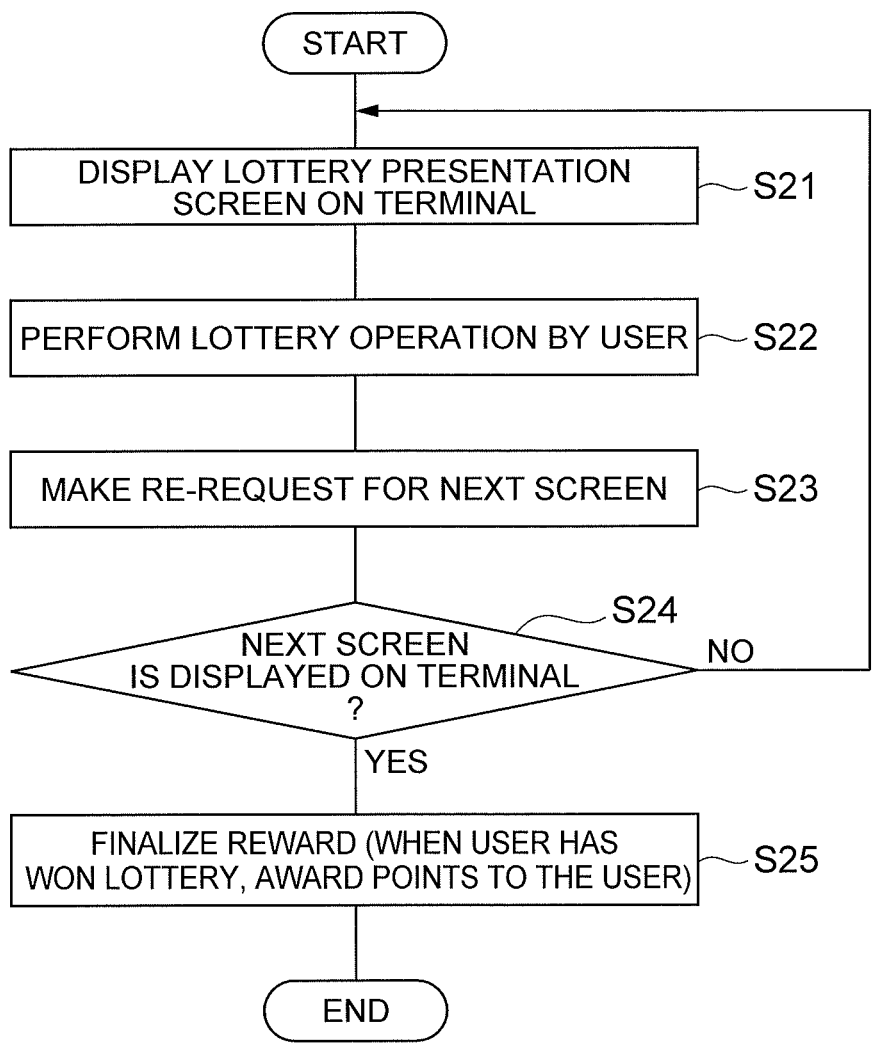
FIG. 13 is a flowchart showing a process of finalizing a reward on the basis of a lottery.

When the lottery presentation screen information is generated and transmitted, the process shown in FIG. 13 is executed. First, on the terminal 20, the screen receiving unit 22 receives the lottery presentation screen information, and the display unit 23 displays a lottery presentation screen on the basis of the information (Step S21). A user performs a lottery operation through the lottery presentation screen (Step S22). When a lottery on the basis of the operation ends, a re-request for the next screen is executed by the function of the lottery presentation screen (Step S23). When the next screen is displayed on the terminal 20 in response to the re-request (YES in Step 24), lottery information is transmitted from the terminal 20 to the server 10, and the point update unit 18 executes a process on the basis of the lottery information (Step S25). When a user has won a lottery, points are added to the user in the process of Step S25, and a reward is finalized as a result.

On the other hand, when the next screen is not displayed regardless of the re-request (NO in Step S24), the processes of Steps S21 to S23 are repeated. Specifically, the lottery presentation screen continues to be displayed, and the user can continue to play a lottery.

Figure 14:
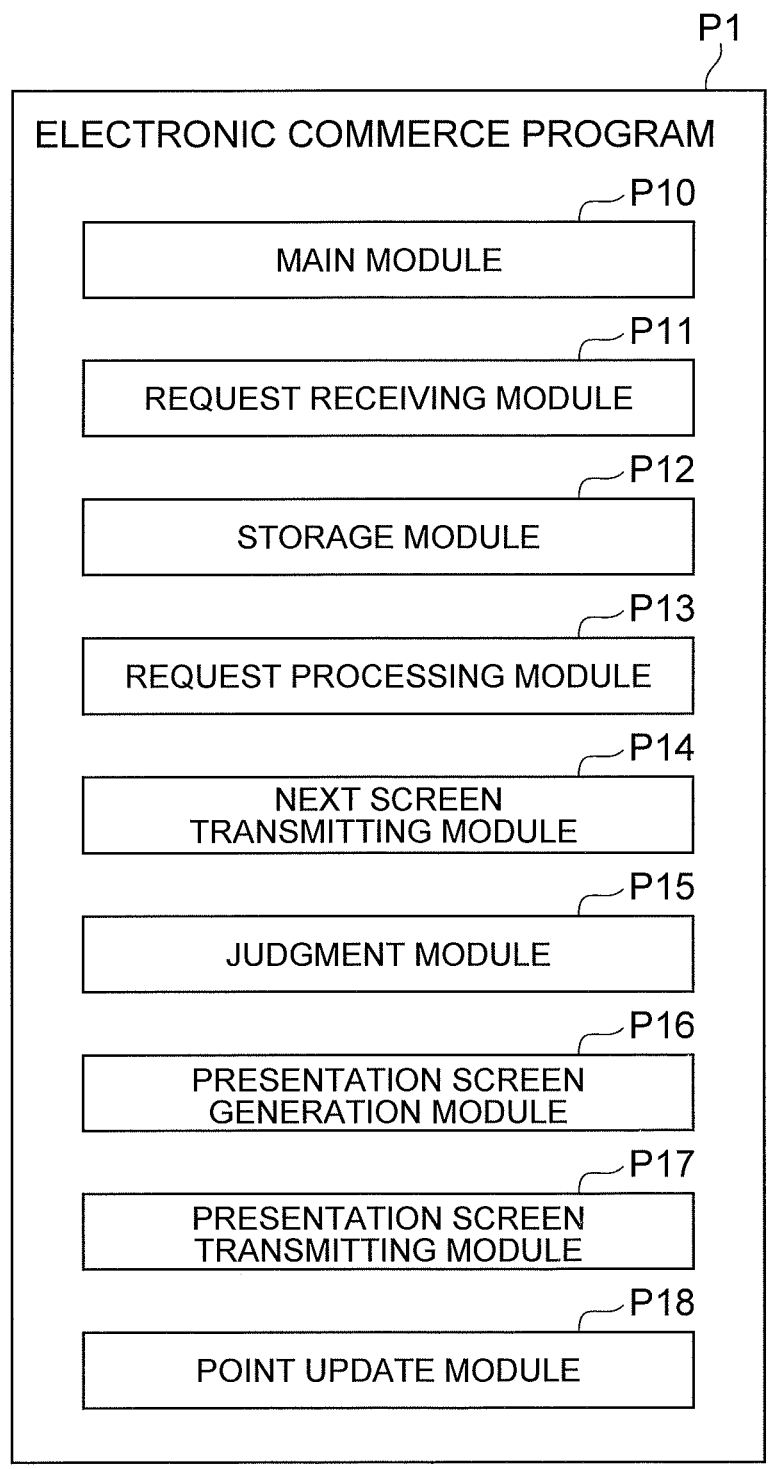
FIG. 14 is a diagram showing a configuration of an electronic commerce program according to an embodiment.

Hereinafter, an electronic commerce program (access management program) that causes a computer to function as the server 10 is described with reference to FIG. 14.

An electronic commerce program P1 includes a main module P10, a request receiving module P11, a storage module P12, a request processing module P13, a next screen transmitting module P14, a judgment module P15, a presentation screen generation module P16, a presentation screen transmitting module P17, and a point update module P18.

The main module P10 is a part that exercises control over the electronic commerce process including access management. The functions implemented by executing the request receiving module P11, the storage module P12, the request processing module P13, the next screen transmitting module P14, the judgment module P15, the presentation screen generation module P16, the presentation screen transmitting module P17 and the point update module P18 are equal to the functions of the request receiving unit 11, the database 12, the request processing unit 13, the next screen transmitting unit 14, the judgment unit 15, the presentation screen generation unit 16, the presentation screen transmitting unit 17 and the point update unit 18 of the server 10, respectively.

The electronic commerce program P1 is provided in the form of being recorded in a static manner on a recording medium such as CD-ROM or DVD-ROM or semiconductor memory, for example. Further, the electronic commerce program P1 may be provided as a data signal superimposed onto a carrier wave through a communication network.

As described above, according to the present embodiment, when the transmission of the next screen information fails during a series of processes, the lottery presentation screen that offers chances to earn points to a user is displayed on the terminal 20. The lottery presentation screen is a screen generated on the basis of reward conditions determined based on the status of screen transition in the terminal 20, and the reward conditions are displayed in accordance with the status of screen transition on the lottery presentation screen.

The status of screen transition indicates a user's visiting status in the site. Because a user can play a lottery after checking reward conditions corresponding to the visiting status in the site through the lottery presentation screen as described above, it is possible to arouse the user's passion for gambling, thereby keeping a user stay in the site.

Further, a site establisher (an administrator of a virtual shopping mall) can preferentially make a user desired to remain in a site stay in the site by offering the lottery presentation screen in accordance with the status of screen transition (user's visiting status). In the above-described example, a user who is assumed to have a strong intention to purchase an item can be preferentially made stay in the site. For example, a site establisher can make a user who has proceeded to the order page stay in the site in preference to a user who has proceeded to the shopping cart page, and make a user who has proceeded to the order confirmation page stay in the site in preference to a user who has proceeded to the order page.

In this embodiment, because a reward is finalized only after the next screen that should be displayed originally is displayed, it is possible to prevent a user from just playing a lottery and leaving the web site of the virtual shopping mall.

The embodiment of the present invention is described in detail above. However, the present invention is not restricted to the above-described embodiment. Various changes and modifications may be made to the present invention without departing from the scope of the invention.

Although the present invention is applied to the electronic commerce system 1 in the above-described embodiment, the application of the present invention is not limited thereto. The present invention may be applied to access management of an information processing system that performs a process of guiding a user to complete one procedure by sequentially displaying a plurality of screens. For example, the present invention may be applied to the case of performing an initial user registration process in a web site that offers a specified service, a rental process in a web site that offers an item rental service and the like. Further, the present invention may be applied to a web site that offers a service without use of a shopping cart (for example, application for a credit card, setup of a bank account, insurance product, document request and the like). In such a case, the reward conditions can be set so that the winning probability is higher for those who have entered their addresses than for those who have not entered their addresses, for example.

Although points are awarded as a reward to a user in the above-described embodiment, the type of the reward is not limited thereto. For example, a coupon that can be used in lieu of money in a virtual shopping mall, some gift and the like may be awarded as a reward.

Although winning points are finalized only after the next screen that should be displayed originally is displayed in the above-described embodiment, the points may be awarded to a user immediately at the time when a lottery result is determined without waiting for the next screen to be displayed.

The functions of the server 10 may be distributed among a plurality of servers or computer systems. For example, the database 12 or the point update unit 18 may be implemented in another server different from the server 10.

REFERENCE SIGNS LIST

1 ... electronic commerce system, 10 ... server (access management server), 11 ... request receiving unit (request receiving means), 12 ... database, 13 ... request processing unit (next screen generation means), 14 ... next screen transmitting unit (next screen transmitting means), 15 ... judgment unit (judgment means), 16 ... presentation screen generation unit (determination means, presentation screen generation means), 17 ... presentation screen transmitting unit (presentation screen transmitting means), 20 ... terminal, 21 ... request transmitting unit, 22 ... screen receiving unit, 23 ... display unit, 24 ... lottery information acquisition unit, 25 ... lottery information transmitting unit, P1 ... electronic commerce program (access management program), P10 ... main module, P11 ... request receiving module, P12 ... storage module, P13 ... request processing module, P14 ... next screen transmitting module, P15 ... judgment module, P16 ... presentation screen generation module, P17 ... presentation screen transmitting module, P18 ... point update module, E ... lottery presentation screen

The invention claimed is:

1. An access management server for sequentially displaying screens on a terminal in accordance with request information received from the terminal, comprising:
    a request receiving unit for receiving the request information from the terminal;
    a next screen generation unit for generating next screen information for displaying a next screen on the terminal in accordance with the request information received by the request receiving unit;
    a next screen transmitting unit for transmitting the next screen information generated by the next screen generation unit to the terminal;
    a judgment unit for judging whether the next screen information has been transmitted to the terminal by the next screen transmitting unit;
    a determination unit for determining reward conditions regarding a predetermined reward based on a screen transition status of the terminal when it is judged that the next screen information has not been transmitted to the terminal;
    a presentation screen generation unit for generating lottery presentation screen information for displaying a lottery presentation screen on the terminal based on the reward conditions determined by the determination unit, the reward conditions being displayed on the lottery presentation screen in accordance with the screen transition status; and
    a presentation screen transmitting unit for transmitting the lottery presentation screen information generated by the presentation screen generation unit to the terminal.

2. The access management server according to claim 1, further comprising:
    a registration unit for finalizing a reward to be awarded to a user of the terminal based on a lottery result on the lottery presentation screen when the next screen is displayed on the terminal by a re-request for the next screen information from the terminal, and storing the finalized reward for the user into a predetermined database.

3. The access management server according to claim 1, wherein
    a payout rate is included in the reward conditions, and
    a payout rate when second next screen information corresponding to a second screen to be displayed later than a first screen has not been transmitted is higher than a payout rate when first next screen information corresponding to the first screen has not been transmitted.

4. The access management server according to claim 1, wherein
the lottery presentation screen continues to be displayed on the terminal until the next screen is displayed on the terminal by a re-request for the next screen information from the terminal, and
a lottery result on the lottery presentation screen is shown before transition from the lottery presentation screen to the next screen.

5. The access management server according to claim 1, wherein
the lottery presentation screen is constructed so that a user of the terminal can execute a lottery a plurality of times, and
a payout rate for a lottery on the lottery presentation screen is adjusted in accordance with the number of times of lotteries so that the payout rate decreases as an increase in the number of times of lotteries.

6. An access management method executed by an access management server for sequentially displaying screens on a terminal in accordance with request information received from the terminal, comprising:
   a request receiving step of receiving the request information from the terminal;
   a next screen generation step of generating next screen information for displaying a next screen on the terminal in accordance with the request information received in the request receiving step;
   a next screen transmitting step of transmitting the next screen information generated in the next screen generation step to the terminal;
   a judgment step of judging whether the next screen information has been transmitted to the terminal in the next screen transmitting step;
   a determination step of determining reward conditions regarding a predetermined reward based on a screen transition status of the terminal when it is judged that the next screen information has not been transmitted to the terminal;
   a presentation screen generation step of generating lottery presentation screen information for displaying a lottery presentation screen on the terminal based on the reward conditions determined in the determination step, the reward conditions being displayed on the lottery presentation screen in accordance with the screen transition status; and
   a presentation screen transmitting step of transmitting the lottery presentation screen information generated in the presentation screen generation step to the terminal.

7. A non-transitory computer readable recording medium recording an access management program causing a computer to function as an access management server for sequentially displaying screens on a terminal in accordance with request information received from the terminal, the access management program causing the computer to execute:
   a request receiving unit for receiving the request information from the terminal;
   a next screen generation unit for generating next screen information for displaying a next screen on the terminal in accordance with the request information received by the request receiving unit;
   a next screen transmitting unit for transmitting the next screen information generated by the next screen generation unit to the terminal;
   a judgment unit for judging whether the next screen information has been transmitted to the terminal by the next screen transmitting unit;
   a determination unit for determining reward conditions regarding a predetermined reward based on a screen transition status of the terminal when it is judged that the next screen information has not been transmitted to the terminal;
   a presentation screen generation unit for generating lottery presentation screen information for displaying a lottery presentation screen on the terminal based on the reward conditions determined by the determination unit, the reward conditions being displayed on the lottery presentation screen in accordance with the screen transition status; and
   a presentation screen transmitting unit for transmitting the lottery presentation screen information generated by the presentation screen generation unit to the terminal.

\* \* \* \* \*